(12) United States Patent
Burn, III (10) Patent No.: US 7,286,735 B1
(45) Date of Patent: Oct. 23, 2007

(54) MULTI-AXIS OPTICAL DEVICE ALIGNMENT APPARATUS

(75) Inventor: Robert Daniel Burn, III, Woodside, CA (US)

(73) Assignee: Finisar Corporation, Sunnyvale, CA (US)

( * ) Notice: Subject to any disclaimer, the term of this patent is extended or adjusted under 35 U.S.C. 154(b) by 258 days.

(21) Appl. No.: 10/754,161

(22) Filed: Jan. 9, 2004

Related U.S. Application Data (60) Provisional application No. 60/438,910, filed on Jan. 9, 2003.

(51) Int. Cl.
*G02B 6/42* (2006.01)
(52) U.S. Cl. ....................................................... 385/52
(58) Field of Classification Search ................... 385/52
See application file for complete search history.

(56) References Cited

U.S. PATENT DOCUMENTS

| | | | | |
|---|---|---|---|---|
| 3,260,157 A | * | 7/1966 | Boughton | 359/379 |
| 3,508,835 A | * | 4/1970 | Ware | 356/396 |
| 4,598,242 A | * | 7/1986 | Hayashi et al. | 318/640 |
| 5,042,709 A | * | 8/1991 | Cina et al. | 228/105 |
| 5,172,265 A | * | 12/1992 | Noguchi et al. | 359/368 |
| 6,151,161 A | * | 11/2000 | Mayer et al. | 359/392 |
| 6,341,187 B1 | * | 1/2002 | Wu et al. | 385/52 |
| 6,931,752 B2 | * | 8/2005 | Tsuda et al. | 33/645 |

OTHER PUBLICATIONS

Melles Griot, *APT System Six-Axis Positioning Stage*, Dec. 22, 2003 ( 3 pages).
Melles Griot, *APT System Six-Axis Positioning Stage (Figure)*, Dec. 22, 2003 (1 page).
Melles Griot, *Motion Devices*, Dec. 22, 2003 (1 page).
Melles Griot, *Automated Alignment*, Dec. 22, 2003 (4 pages).

* cited by examiner

*Primary Examiner*—Ellen E. Kim
(74) *Attorney, Agent, or Firm*—Workman Nydegger (57) ABSTRACT

An alignment system for aligning optical components is disclosed. The alignment system presents a kinematic, de-coupled alignment solution that facilitates rapid alignment between optical components while preserving a simple design. In one embodiment, the alignment system includes a mounting stage having a base and an alignment carriage engaged with the base. The base includes a plurality of contact points on which a spherical surface of the alignment carriage is supported. The contact points enable the alignment carriage to be rotated into a variety of positions. This in turn enables an optical component mounted to a component mount on the alignment carriage to be correspondingly maneuvered when the alignment carriage is rotated. A plurality of rotational control assemblies are employed to selectively rotate the alignment carriage in response to user input. In one embodiment, one rotational control assembly is employed for rotation about each of three orthogonal rotational axes.

24 Claims, 6 Drawing Sheets

MULTI-AXIS OPTICAL DEVICE ALIGNMENT APPARATUS

CROSS-REFERENCE TO RELATED APPLICATIONS

This application claims the benefit of U.S. Provisional Application No. 60/438,910, filed Jan. 9, 2003, which is incorporated herein by reference in its entirety.

BACKGROUND OF THE INVENTION

1. The Field of the Invention

The present invention generally relates to optical devices and networks. More particularly, the present invention relates to an optical device alignment apparatus that enables quick, de-coupled alignment of optical components.

2. The Related Technology

Fiber optic technology is increasingly employed as a method by which information can be reliably transmitted via a communications network. Networks employing fiber optic technology are known as optical communications networks, and are marked by high bandwidth and reliable, high-speed data transmission.

Various optical devices and components are employed in optical communications networks to facilitate the transfer of optical signals through the network. To ensure proper optical signal transfer between such devices and components, it is necessary to properly align them with respect to one another establish an optimum optical path therebetween and to ensure good optical signal propagation through the network.

For instance, optical add/drop modules ("OADMs") typically include optical fibers that are attached to a housing containing a filter element. A multiplexed optical signal that is input to the housing via one of the optical fibers can pass through the filter element, which selectively adds or drops a channel to or from the multiplexed signal. The optical fibers are typically arranged into one or more structures, commonly known as "pigtails," which are attached to the housing. Proper alignment between the filter element and each pigtail in the OADM is essential to ensure that the channel add or channel drop operation occurs as intended.

The alignment referred to above occurs primarily during the manufacturing phase of the optical device or component. In a typical alignment operation between two optical components, such as the pigtail and filter element of the OADM discussed above, one or both of the components are moved relative to one another in Cartesian translational and/or rotational axes in order to maximize the transmission of a nominal optical signal from one to the other. When optimum alignment is achieved, the two components can be secured in a fixed positional relationship with respect to one another. Certain devices, known as mounting stages, are usually employed to perform such alignment operations. Examples of mounting stages include rotation stages, translation stages, and goniometers.

Notwithstanding their ability to optically align optical components and devices, however, known mounting stages nevertheless suffer from certain challenges. For instance, some known mounting stage designs require that the user repeatedly adjust multiple control inputs simultaneously while searching for a correct alignment position. This undesirably results in an increased consumption of time required to perform the optical alignment, given the nature of mounting stage design. With some mounting stages, for instance, several hours may be required to complete a single alignment operation. In addition, known mounting stages suffer from relatively complex designs that further complicate their use during alignment operations.

In light of the above discussion, a need exists for an optical device alignment apparatus that does not suffer from the above challenges. In particular, an alignment apparatus is needed that benefits from simple design principles to enable de-coupled alignment of optical components. Such an apparatus should also facilitate simple alignment procedures, thereby increasing manufacturing efficiency and reducing the total time required for optical device alignment.

BRIEF SUMMARY OF THE INVENTION

The present invention has been developed in response to the above and other needs in the art. Briefly summarized, embodiments of the present invention are directed to a system for aligning optical components used in optical apparatus and communications networks. In particular, embodiments are directed to a mounting stage that can be used to align optical components in a de-coupled manner, thereby hastening the alignment process and improving manufacturing efficiency for such optical components.

In one embodiment, the mounting stage includes a base and an alignment carriage. The alignment carriage sits atop and movably engages the base via three contact points defined on the base. The alignment carriage includes a spherical surface that engages each of the contact points, allowing the alignment carriage to be maneuvered about rotational axes with respect to the base.

The mounting stage in one embodiment includes three rotational control assemblies for selectively maneuvering the alignment carriage about three intersecting, orthogonal, rotational axes. In detail, a pitch rotational control assembly includes a control screw and sleeve that engage a pitch paddle attached to the alignment carriage. Similarly, a roll rotational control assembly and a yaw rotational control assembly each include a control screw and sleeve that respectively engage a roll paddle and yaw paddle of the alignment carriage.

The control screw of each rotational control assembly is adjustable to selectively move the alignment carriage along the respective rotational axis via the corresponding paddle. Thus, movement of the control screw against the respective paddle causes the alignment carriage to rotate about the corresponding axis. In this way, the alignment carriage of the mounting stage can be rotated about one or more of the rotational axes represented by the pitch, roll, and yaw rotational control assemblies.

A component mount is positioned on the alignment carriage of the mounting stage at the rotational center of the alignment carriage. An optical component can therefore be positioned on the component mount at or near the rotational center of the alignment carriage. So positioned, the optical component can be maneuvered as needed according to the rotational movement of the alignment carriage to which it is attached. This enables the optical component to be properly aligned with another device or component before mating or otherwise attaching the components.

The mounting stage of present embodiments allows for coordinated or independent rotation along one or more rotational axes, thereby ensuring a kinematic, de-coupled mounting stage that operates on six points of contact, including the three contact points and the three rotational control assemblies. As such, the mounting stage facilitates rapid component alignment. Moreover, the mounting stage can be manually or automatically driven to maximize flexibility of use in a variety of operating environments. In addition, the nature of the mounting stage allows for precise and repeatable alignment operations, which further contributes to operational efficiency, while presenting a less expensive solution for optimum optical alignment than other known alignment stages or devices.

The mounting stage of present embodiments can benefit a variety of alignment applications, including but not limited to optical fiber alignment, fiber optic component alignment, optical waveguide alignment, and mirror or lens alignment.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1-7 depict various features of embodiments of the present invention, which is generally directed to an alignment system for use with optical components. In particular, a de-coupled, kinematic mounting stage is disclosed, the mounting stage providing an efficient means by which optical components can be precisely and quickly aligned with other components in preparation for their use in optical devices and communications networks. Embodiments of the present mounting stage provide an alignment solution that is more economical and faster than known alignment apparatus currently available.

It will be appreciated that words such as "top," "bottom," "side," "upper," "lower,""pitch," "yaw," and "roll" are used herein merely to enable an adequate description of embodiments of the invention to be made. As such, these and other descriptive terms should not be construed as limiting the invention in any way.

Figure 1:
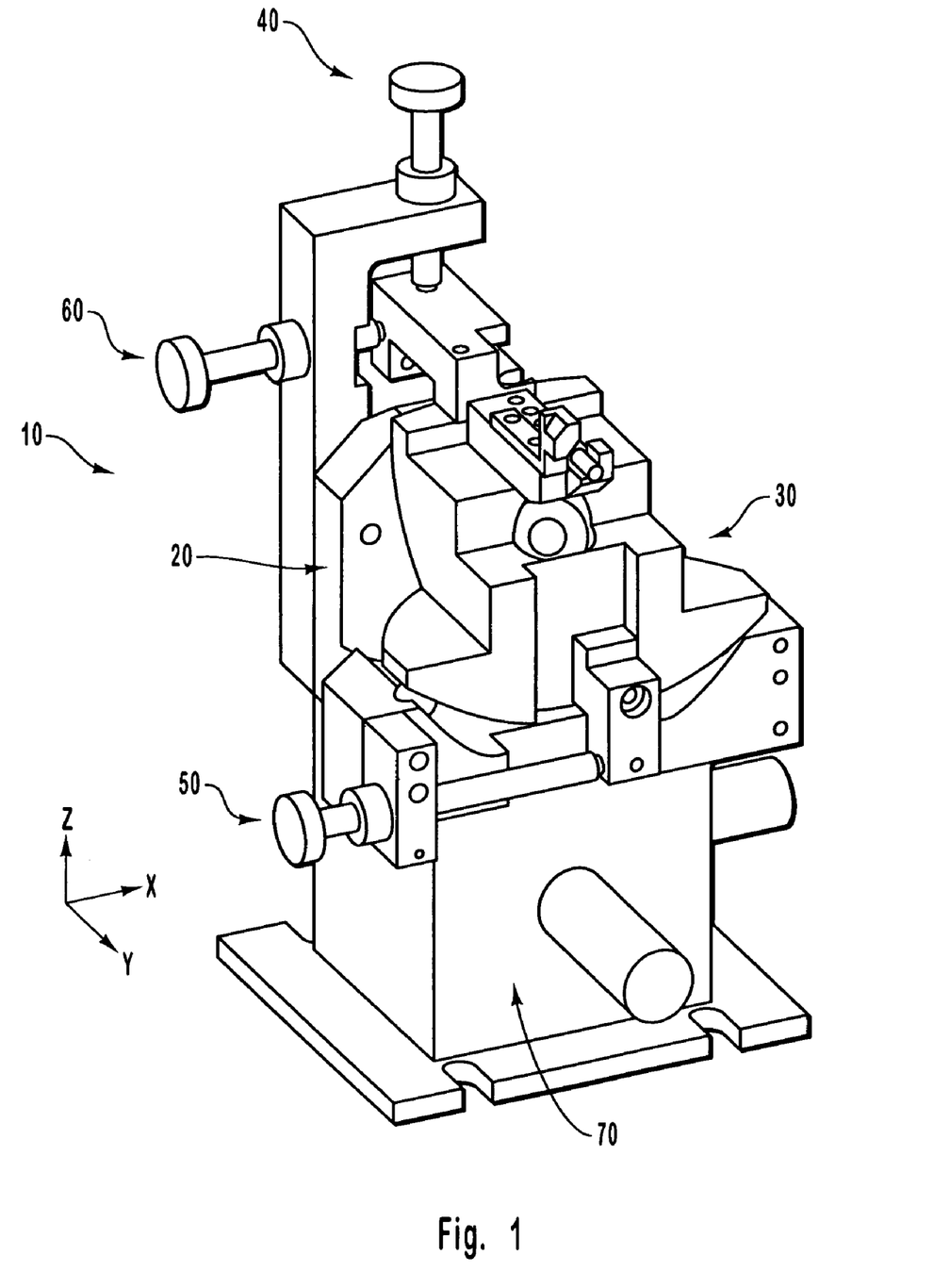
FIG. 1 is a perspective view of a mounting stage made in accordance with one embodiment of the present invention.

Reference is first made to FIG. 1, which shows various features of one embodiment of the present invention. In detail, a mounting stage is shown, generally indicated at 10. As depicted, the mounting stage 10 includes various components, including a base 20, an alignment carriage 30, and three rotational control assemblies, namely, a pitch rotational control assembly 40, a roll rotational control assembly 50, and a yaw rotational control assembly 60. Various features of each of these components will be described in further detail below.

In the illustrated embodiment, the mounting stage 10 is positioned atop a translation stage component 70 that is attached to and supports the base 20. The translation stage component 70 can be used to maneuver the base 20, and thus the alignment carriage 30, along one or more Cartesian translational axes, i.e., the x, y, and z axes noted in FIG. 1. As such, the translation stage component 70 adds three translational degrees of freedom to the three rotational degrees of freedom of the mounting stage 10. In other embodiments, the translation stage component 70 can be eliminated.

Figure 2:
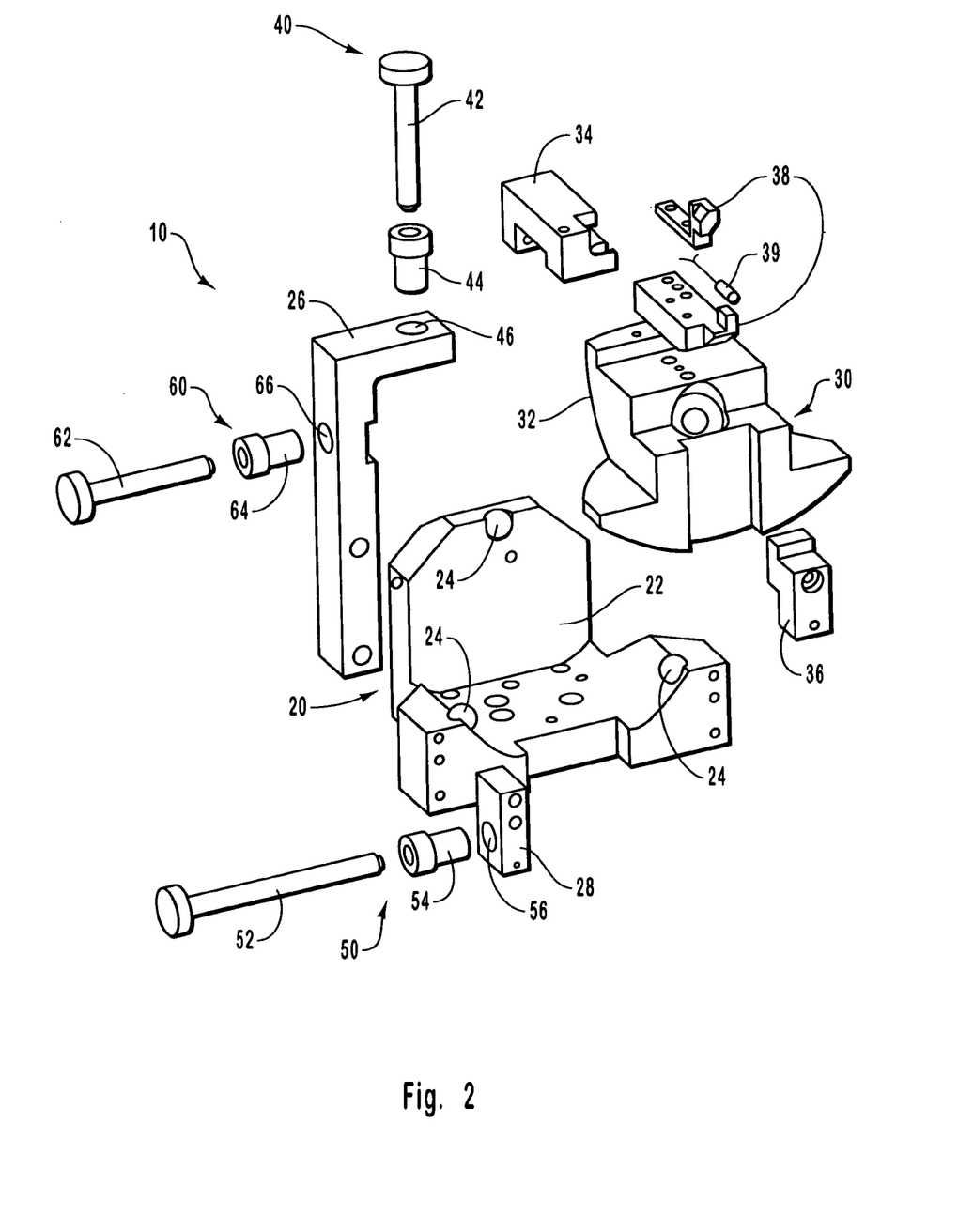
FIG. 2 is an exploded view of a portion of the mounting stage of FIG. 1.

Reference is now made to FIG. 2, in describing in greater detail various features of the mounting stage 10, according to one embodiment. The exploded view of FIG. 2 affords various details of the mounting stage 10 to be discerned. In particular, the general shape of the base 20 is revealed. Base 20 is shaped to define a partial cavity 22 that is sized to receive a portion of the alignment carriage 30 therein. As will be shown, the portion of the alignment carriage 30 that is received into the partial cavity 22 is spherically shaped.

The base 20 further includes means for allowing the alignment carriage 30 to engage the base. In the illustrated embodiment, three fixed contact points 24 are defined in a spaced-apart configuration on the portion of the base 20 that defines the partial cavity 22. So positioned, the contact points 24 provide interposed contact surfaces between the base 20 and the alignment carriage 30. This configuration provides a mechanism whereby relative rotational movement between the base 20 and the alignment carriage 30 can occur. As such, each contact point 24 is distributed from the other contact points on the portion of the base 20 that defines the partial cavity 22 as to provide a three point support scheme for the alignment carriage 30. In the present embodiment, the contact points 24 are smooth metallic pieces that are affixed in place on the base 20. For instance, the contact points can include smooth bronze pieces that are pressed or glued into corresponding recesses defined in the base 20. In other embodiments, contact points of different designs, such as ball bearings, can alternatively be used. Also, more ball bearing contact points than three can be defined on the base 20, if desired.

In addition to providing an engagement area for the alignment carriage 30, the base 20 serves other purposes as well. The base 20 can include, or have attached thereto, various structures for supporting the rotational control assemblies 40, 50, and 60, including a first support bracket 26 and a second support bracket 28. The first support bracket 26 is attached to the base 20 to provide support for the pitch rotational control assembly 40 and yaw rotational control assembly 60, while the second support bracket 28 is attached to the base to support the roll rotational control assembly 50. In addition to this configuration, however, other support schemes for the rotational control assemblies can be devised. For instance, the support brackets can be positioned in other locations from that which is shown in FIG. 2, or each rotational control assembly can have a support bracket of its own, if desired. These and other similar modifications to embodiments of the present invention are therefore contemplated to fall within the claims of the present invention. More generally, the various details described herein and shown in the accompanying drawings are exemplary of the principles taught by embodiments of the present invention, and are not meant to limit the invention in any way.

In addition to the above, the base 20 can also serve as a mounting for securing the mounting stage 10 to an appropriate surface, such as a table or a translation stage, such as the translation stage 70 shown in FIG. 1.

As already described, a portion of the alignment carriage 30 engages the base 20 via the contact points 24. This engaging portion of the alignment carriage 30 is a spherically-shaped surface indicated at 32, as seen more clearly in FIG. 3B. The spherical surface 32 allows the alignment carriage 30 to smoothly move on the contact points 24 to one of a variety of possible positions, as will be discussed further below. Alternatively, the alignment carriage 30 can be configured to have a plurality of smaller, spherically shaped portions that are each located where the alignment carriage engages the contact points 24. These and other similar modifications are therefore contemplated. In the present embodiment, the movement of the alignment carriage 30 is restricted such that the spherical surface is in continual contact with each of the contact points during alignment operations.

Attached to the alignment carriage 30 is a plurality of paddles. In detail, a pitch/yaw paddle 34 is attached to an upper portion of the alignment carriage 30, while a roll paddle 36 is attached to a lower portion thereof. The paddles 34 and 36 are positioned to operate in concert with the pitch, roll, and yaw rotational control assemblies 40, 50, and 60. As will be seen below, the pitch rotational control assembly 40 serves as one exemplary means for engaging the pitch/yaw rotation paddle 34 to selectively rotate the alignment carriage 30 about a rotational pitch axis with respect to the base. Similarly, the roll rotational control assembly 50 is one example of a means for engaging the roll rotation paddle 36 to selectively rotate the alignment carriage about a rotational roll axis, while the yaw rotational control assembly 60 is one exemplary means for engaging the pitch/yaw rotation paddle to selectively rotate the alignment carriage about a rotational yaw axis. In addition to these, however, other means for engaging the paddles and selectively rotating the alignment carriage are also possible. Such other means are therefore contemplated as falling within embodiments of the present invention.

Also attached to an upper portion of the alignment carriage 30 is a component mount 38 that is configured to secure an optical component 39. In FIG. 2, the optical component 39 is a pigtail, though any one of a variety of components can be placed thereon.

In the embodiment illustrated in FIG. 2, the shape of the alignment carriage 30 can be roughly defined as a quarter-sphere segment. A rotational center 37 (FIGS. 3A and 3B) of the alignment carriage 30 is configured to reside at what would be the central point of an imaginary sphere that corresponds to the quarter-sphere segment defined by the alignment carriage. As such, the component mount 38 is positioned on the alignment carriage 30 such that the optical component 39 is positioned at or near the rotational center 37, thereby enhancing accuracy during optical alignment operations. Further, the component mount 38 in the present embodiment is configured such that the optical component 39 can be adjustably positioned on the mount in one of a variety of positions with respect to the rotational center 37.

FIG. 2 also shows each of the rotational control assemblies in exploded view. In particular, the pitch rotation control assembly 40 includes a control screw 42 and a hollow sleeve 44 that receives a portion of the control screw therein. The sleeve 44 is in turn received into and secured within a hole 46 defined in the first support bracket 26. In the illustrated embodiment, the control screw 42 of the pitch rotation control assembly 40 is threaded to threadingly engage with corresponding threads defined about the hollow portion of the sleeve 44. In other embodiments, the sleeve 44 can be omitted such that the control screw is directly received into and threadingly engages with the hole 46 in the first support bracket. In yet other embodiments, the threads from the control screw can be omitted and adjustment of the control screw can be achieved by pushing or pulling motions. In still other embodiments, the control screw can be replaced by an actuator, such as a motorized actuator, or other similar device.

The roll rotational control assembly 50 and the yaw rotational control assembly 60 are configured similarly in design and function to the pitch rotational control assembly 40. In particular, the roll rotational control assembly 50 includes a control screw 52 and a hollow sleeve 54 that receives a portion of the control screw therein. The sleeve 54 is in turn received into and secured within a hole 56 defined in the second support bracket 28. The control screw 52 threadingly engages with corresponding threads defined about the hollow portion of the sleeve 54.

In like manner, the yaw rotational control assembly 60 includes a control screw 62 and a hollow sleeve 64 that receives a portion of the control screw therein. The sleeve 64 is in turn received into and secured within a hole 66 defined in the first support bracket 26. The control screw 62 is threaded as to threadingly engage with corresponding threads defined about the hollow portion of the sleeve 64. Though alike in design and function in the illustrated embodiment, it is appreciated that the rotational control assemblies can differ from one another in alternative embodiments.

The control screws 42, 52, and 62 can be threaded to cause a predetermined amount of rotation of the alignment carriage 30 in response to a specified revolution of the respective control screw, as will be seen further below. In the present embodiment, for example, a rotation of the alignment carriage 30 of approximately 10 microrads about a specified axis can be achieved for each one-degree turn of a specified one of the control screws 42, 52, or 62. This relationship can be altered in other embodiments by modifying the characteristics of the control screws, including thread size and pitch.

Figure 3A:
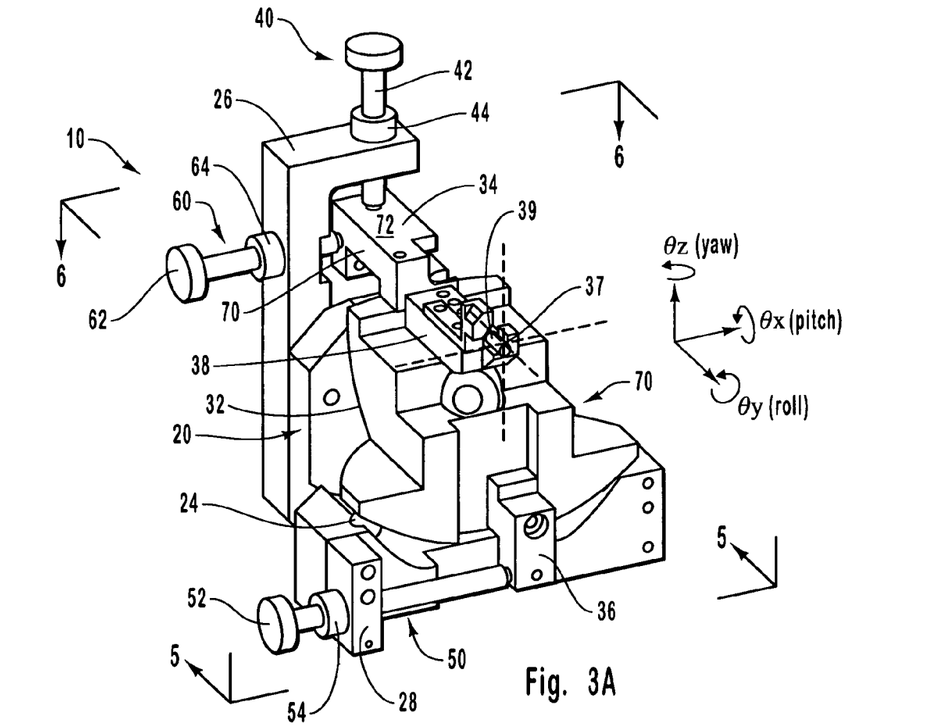
FIG. 3A is one perspective view of portions of the mounting stage shown in FIG. 1.
Figure 3B:
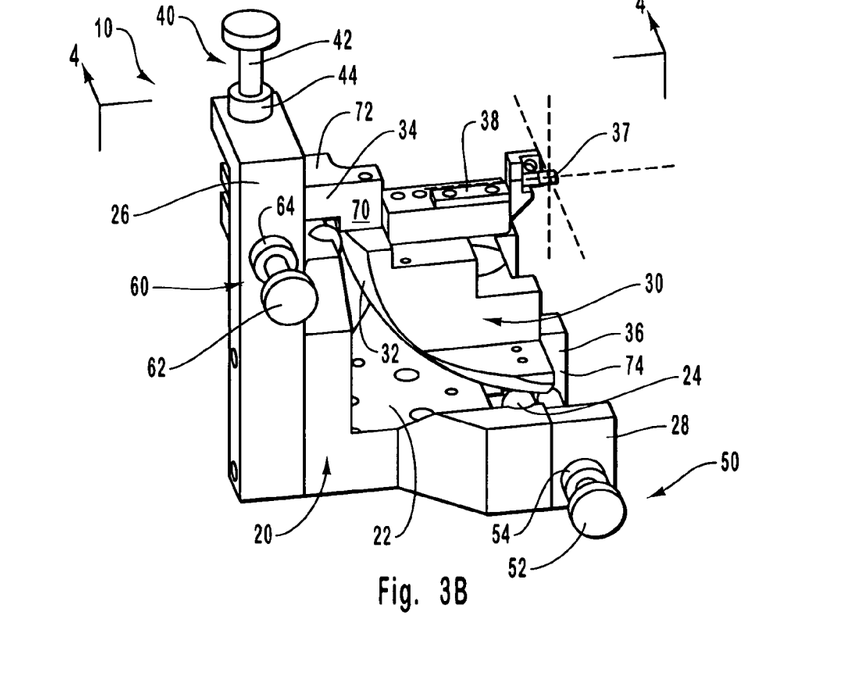
FIG. 3B is another perspective view of the mounting stage portion shown in FIG. 3A.

Reference is now made to FIGS. 3A and 3B, which each show assembled views of the mounting stage 10 of FIG. 2. The rotational control assemblies 40, 50, and 60 are each aligned with one of the pitch/yaw or roll paddles 34 and 36. This enables physical engagement between a specified rotational control assembly and the corresponding paddle to occur, which enables the alignment carriage 30, and hence the optical component 39 mounted on the component mount 38, to be selectively maneuvered according to actuation of one or more of the rotational control assembles. In particular, the alignment carriage 30 can be rotated about one or more of three rotational axes, as noted in FIG. 3A. The rotational axes correspond to the three Cartesian axes shown in FIG. 1. Specifically, rotation of the alignment carriage 30 can occur about the x-axis ($\theta x$), the y-axis ($\theta y$), or the z-axis (θz). These axes are also referred to herein as the pitch, roll and yaw rotational axes, respectively. Rotation of the alignment carriage 30 about one or more of the pitch, roll, and yaw axes enables the optical component 39 to be positioned as needed in order to desirably align it with another component (not shown) during an alignment operation. Note that in other embodiments, the particular orientation of the rotational axes with respect to the alignment carriage 30 can be alternatively defined in order to customize the motion of the alignment carriage.

As mentioned above, each of the rotational control assemblies 40, 50, and 60 engages one of the pitch/yaw paddle 34 and the roll paddle 36. In detail, the control screw 42 of the pitch rotational control assembly 40 extends through the sleeve 44 and hole 46 such that the tip of the control screw can selectively engage a designated flat surface of the pitch/yaw paddle 34. Similarly, the control screw 52 of the roll rotational control assembly 50 extends through the sleeve 54 and hole 56 such that the tip of the control screw can selectively engage a designated flat surface of the roll paddle 36, while the control screw 62 of the yaw rotational control assembly 60 extends through the sleeve 64 and hole 66 such that the tip of the control screw can selectively engage a designated flat surface of the pitch/yaw paddle 34. Again, this arrangement between the rotational control assemblies 40, 50, and 60 and the paddles 34, 36 enables selective maneuvering of the alignment carriage 30, and further details regarding this rotational operation of the mounting stage 10 are given further below.

Though the surfaces of pitch/yaw paddle 34 and roll paddle 36 that are engaged by the tips of the control screws 42, 52, and 62 are flat, it is appreciated that the paddle surfaces could define other contours as may be needed for a particular application.

In one embodiment, the rotational control assemblies 40, 50, and 60 are positioned in the mounting stage to enable optimum maneuvering of the alignment carriage 30, and thus the optical component 39 to be aligned. In general, each rotational control assembly is positioned with respect to the alignment carriage such that the longitudinal axis of a specified control screw intersects the rotational axis, pertaining to another rotational control assembly, that is not parallel to the longitudinal axis of the specified control screw. Specifically, the pitch rotational control assembly 40 is positioned such that the longitudinal axis of the control screw 42 intersects the roll rotational axis, as shown in FIG. 3A. The roll rotational control assembly 50 is positioned such that the longitudinal axis of the control screw 52 intersects the yaw rotational axis. And the yaw rotational control assembly 60 is positioned such that the longitudinal axis of the control screw 62 also intersects the roll rotational axis. Correspondingly, the pitch/yaw paddle 34 and roll paddle 36 are positioned in accordance with the above specifications such that the tips of the control screws 42, 52, and 62 properly engage the respective paddles in order to selectively maneuver the alignment carriage 30, as discussed below. This configuration, together with the placement of the optical component 39 at the rotational center 37—the rotational center being defined by the intersection of the pitch, roll, and yaw rotational axes as shown by the dashed lines passing through the rotational center in FIGS. 3A and 3B—allows for de-coupled rotation of the alignment carriage 30 about any one of the pitch, roll, or yaw axes without affecting movement in the other two axes.

Note that the specified positions of the rotational control assemblies and paddles discussed above are exemplary according to one embodiment. Other positional configurations for these elements are also possible in other embodiments.

Figure 4:
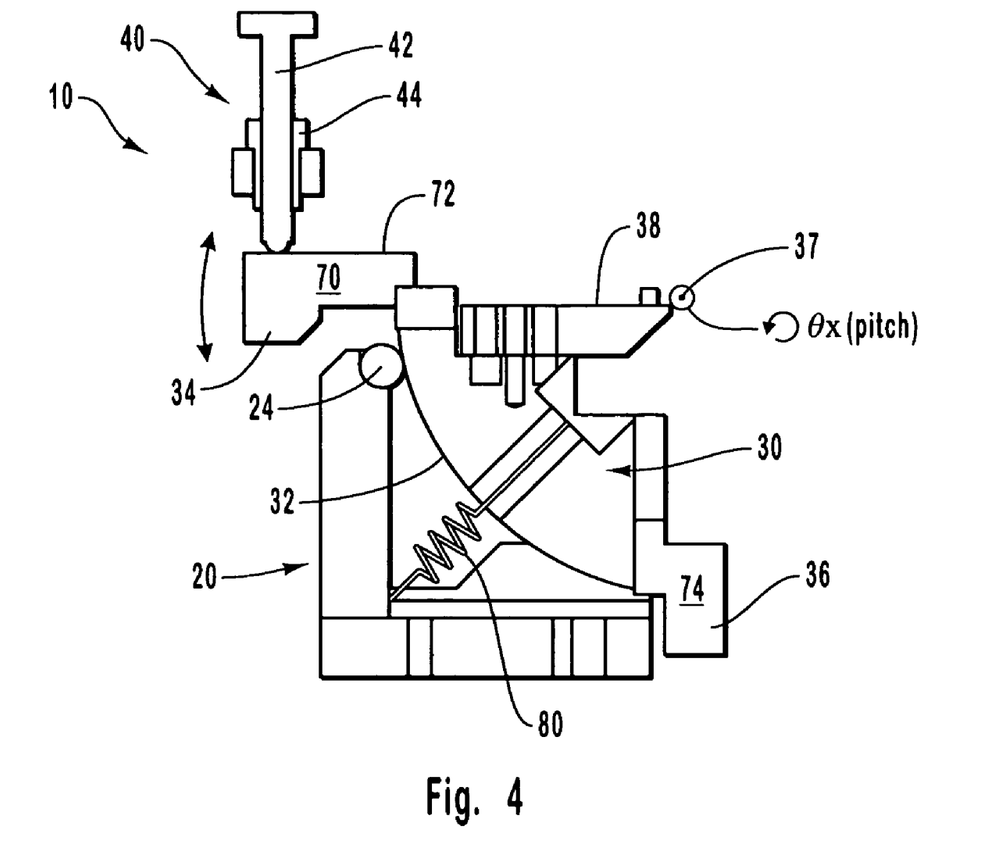
FIG. 4 is a cross sectional view of a portion of the mounting stage, taken along the line 4-4 in FIG. 3B.

Together with FIGS. 3A and 3B, reference is now made to FIG. 4, showing a cross sectional view of the mounting stage 10 taken along the lines 4-4 of FIG. 3B. FIG. 4 affords a view of the operation of the pitch rotational control assembly 40 in selectively rotating the alignment carriage 30 about the pitch axis θx (see also FIG. 3A). Note that the optical component 39 has been removed from the component mount 38 in FIG. 4 for clarity. To create rotational movement about the pitch axis, the threaded control screw 42 of the pitch rotational control assembly 40 is rotated such that its tip engages and exerts a force against a paddle face 72 of the pitch/yaw paddle 34. In response to this force, the alignment carriage 30, which is attached to the pitch/yaw paddle 34, is moved in a counterclockwise direction, from the perspective shown in FIG. 4, about the pitch axis indicated at θx. This movement in turn causes the optical component 39 (FIGS. 3A and 3B), a portion of which is preferably positioned at or near the rotational center 37, to also be maneuvered as may desired during an optical alignment procedure.

FIG. 4 also affords a view of a retaining spring 80 that extends between the base 20 and the alignment carriage 30 to maintain continual contact between the alignment carriage and the contact points 24. Notwithstanding this, the force of the retaining spring 80 is such as to not substantially interfere with maneuvering of the alignment carriage by one or more of the rotational control assemblies 40, 50, and 60. Of course, other means for maintaining contact between the alignment carriage and the contact points can also be used.

Figure 5:
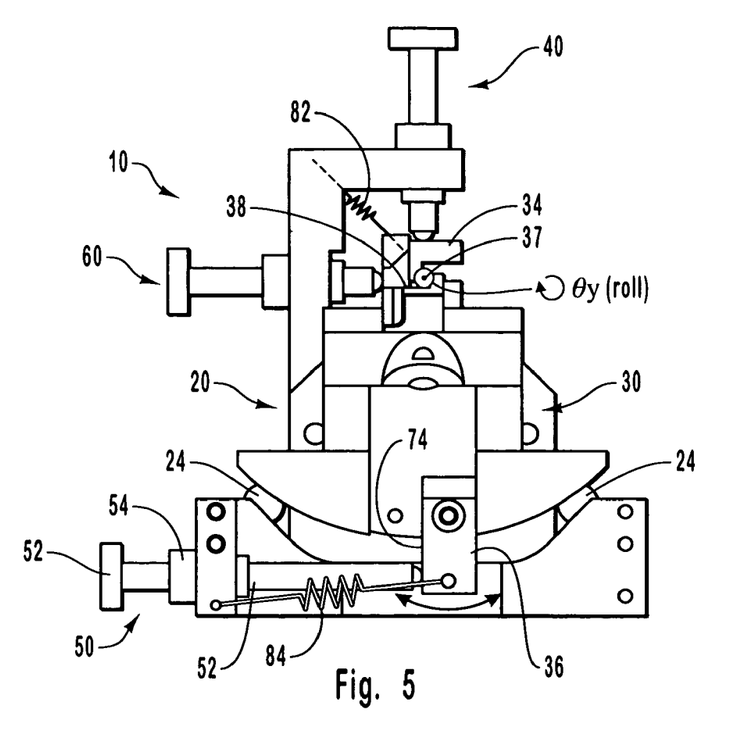
FIG. 5 is an end view of the mounting stage, taken along the line 5-5 in FIG. 3A.

Together with FIGS. 3A and 3B, reference is now made to FIG. 5, showing an end view of the mounting stage 10 taken along the lines 5-5 of FIG. 3A. FIG. 5 affords a view of the operation of the roll rotational control assembly 50 in selectively rotating the alignment carriage 30 about the roll axis θy (see also FIG. 3A). To create rotational movement about the roll axis, the threaded control screw 52 of the roll rotational control assembly 50 is rotated such that its tip engages and exerts a force against a paddle face 74 of the roll paddle 36. In response to this force, the alignment carriage 30, which is attached to the roll paddle 36, is moved in a counterclockwise direction, from the perspective shown in FIG. 5, about the roll axis indicated at θy. This movement in turn causes the optical component 39 (FIGS. 3A and 3B), a portion of which is preferably positioned at or near the rotational center 37, to also be maneuvered as may desired during an optical alignment procedure.

FIG. 5 also shows two retention springs 82, 84 that are attached to the pitch/yaw paddle 34 and roll paddle 36, respectively. The retention springs 82, 84 are used to maintain physical engagement between the control screws of the rotational control assemblies 40, 50, 60 and the respective pitch/yaw paddle 34 and roll paddle 36. As such, (the retention spring 82 is affixed at one end to the first support bracket 26 and at the other end to the pitch/yaw paddle 34. Similarly, the retention spring 84 is affixed at one end to the second support bracket 28 and at the other end to the roll paddle 36. More or less than two retention springs can be used, if desired. Also, other means for maintaining contact between the control screws and paddles can alternatively be used.

Figure 6:
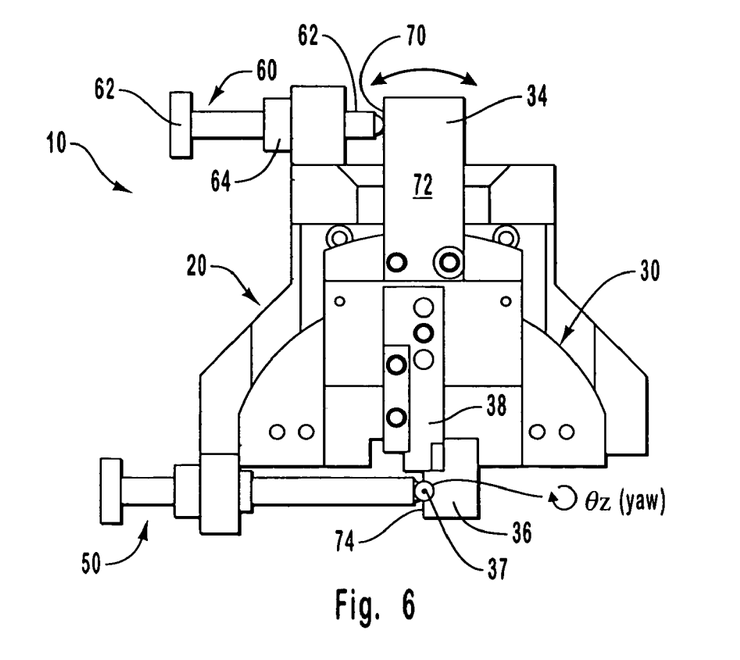
FIG. 6 is a cross sectional view of a portion of the mounting stage, taken along the line 6-6 in FIG. 3A.

Together with FIGS. 3A and 3B, reference is now made to FIG. 6, showing a top cross sectional view of the mounting stage 10 taken along the lines 66 of FIG. 3A. FIG. 6 affords a view of the operation of the yaw rotational control assembly 60 in selectively rotating the alignment carriage 30 about the yaw axis θz (see also FIG. 3A). Note that the optical component 39 has been removed from the component mount 38 in FIG. 6 for clarity. To create rotational movement about the yaw axis, the threaded control screw 62 of the yaw rotational control assembly 60 is rotated such that its tip engages and exerts a force against a paddle face 70 of the pitch/yaw paddle 34. In response to this force, the alignment carriage 30, which is attached to the pitch/yaw paddle 34, is moved in a clockwise direction, from the perspective shown in FIG. 6, about the yaw axis indicated at θz. This movement in turn causes the optical component 39 (FIGS. 3A and 3B), a portion of which is preferably positioned at or near the rotational center 37, to also be maneuvered as may desired during an optical alignment procedure.

When opposite rotation about any of the pitch, roll, and yaw axes is desired, the respective control screw 42, 52, or 62 can be withdrawn by rotating it in the opposite direction from above. The force imposed by the respective retention spring 82 or 84 causes the respective paddle 34 or 36 to move back toward a nominal position, which in turn causes the alignment carriage 30 to rotate about the respective rotational axis in an opposite direction from that described in the above discussion. Note that the tip of each control screw 42, 52, and 62 is rounded to prevent obstruction of movement of the respective paddle when the control screw engages the paddle.

Using the rotational movements described above, an optical component mounted on the component mount of the present embodiment of the mounting stage can be rotated into a variety of positions suitable to enable it to be optically aligned with another component. Moreover, this process is precise, simple, and repeatable, given the de-coupled design of the mounting stage that enables independent rotation about one rotational axis at a time possible.

Inspection of FIGS. 3A and 3B reveals that the pitch/yaw paddle 34 and the roll paddle 36 include the paddle faces 70 and 72, and 74, respectively, on which the respective control screws 42, 52, and 62 engage the paddles to cause the movement described above. The paddle faces 70, 72, and 74 of the paddles 34 and 36 can be configured to have a predetermined width in order to limit the range of rotational motion of the alignment carriage 30. For instance, paddle face 70 of the pitch/yaw paddle 34, which face engages the tip of the yaw control screw 62 has a specified width. The width of paddle face 70 limits the range of rotational motion about the pitch axis because the pitch rotational control assembly 40 can maneuver the pitch/yaw paddle 34 only so far before the paddle face moves beyond the tip of the yaw control screw 62, undesirably making yaw adjustment impossible. Thus, such movement is limited by the width of paddle face 70.

Similarly, the width of paddle face 72 of the pitch/yaw paddle 34 limits the range of rotational motion about the yaw axis, while the width of paddle face 74 of the roll paddle 36 limits the range of rotational motion about the pitch axis. Of course, paddle faces having the same or independently varying widths are possible, in addition to what is described here.

In the present embodiment, the paddle faces 70, 72, and 74 are configured to allow a range of motion of approximately +/−5 degrees for each rotational axis. The range of motion in other embodiments can be modified by altering the width of the paddle faces in accordance with the principles discussed above.

In one embodiment, the rotational control assemblies are manually operated, i.e., the control screws are operated by hand. In another embodiment, however, one or more of the rotational control assemblies can be automatically driven such that movement of the control screws or similar component is performed without manual intervention. In yet another embodiment, linear actuators, which contain no rotatable functionality, can also be used to replace the functionality of the control screws in the rotational control assemblies. Examples of such linear actuators include piezo stack devices and voice coil devices. In addition, other embodiments facilitate the use of feedback devices with the mounting stage to assist in use of the mounting stage in active optical alignment procedures.

It is appreciated that the pitch, roll, and yaw rotational axes are used here for convenience in describing the invention. Indeed, rotational axes differing from those described herein in type and/or number can also be acceptably used.

Figure 7:
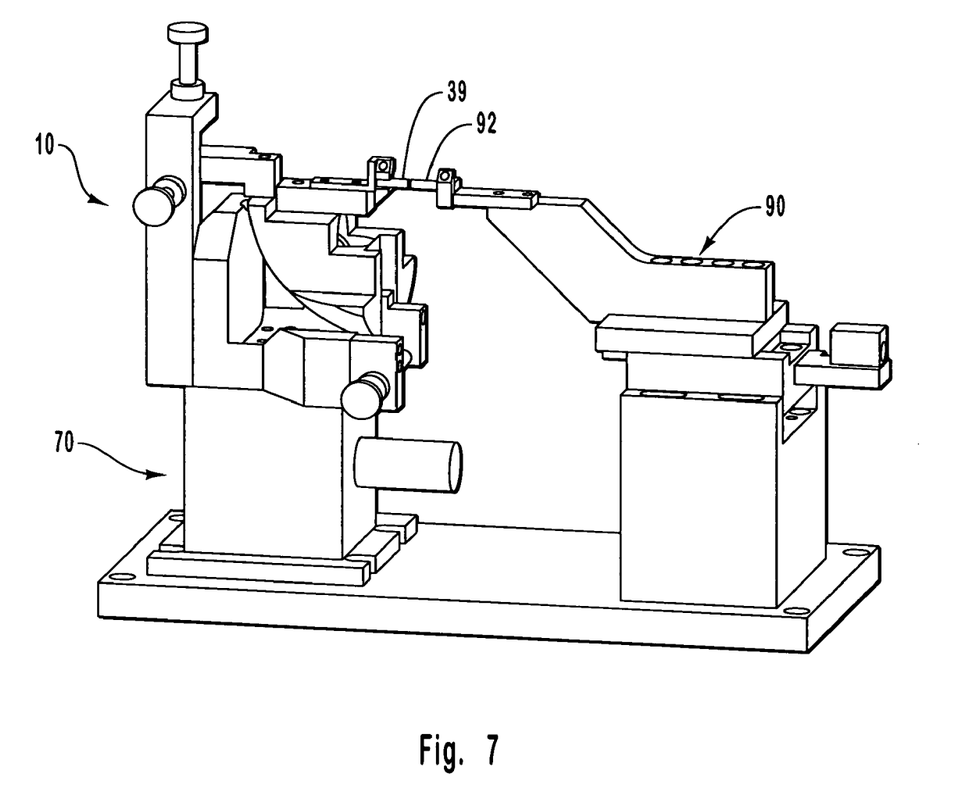
FIG. 7 is a perspective view of the mounting stage and associated apparatus in accordance with one embodiment.

Reference is now made to FIG. 7. In one embodiment, it is appreciated that the mounting stage 10 can be assembled together with additional components to assist in the optical alignment procedure. As such, FIG. 7 shows the mounting stage 10 mounted atop the translation stage 70, as previously shown in FIG. 1. In addition, a component mounting apparatus 90 is shown, having a second optical component 92 located thereon. The apparatus 90 can be used to assist with optically aligning and mating the optical component 39 on the mounting stage 10 with the second optical component 92 of the apparatus 90. This is merely one example of a system for aligning optical components. Other configurations are also contemplated.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An optical device alignment mounting stage, comprising:

a base;

an alignment carriage adjustably engaged with the base;

at least one rotation paddle attached to the alignment carriage;

means for engaging the at least one rotation paddle to selectively rotate the alignment carriage;

a means for engaging a pitch rotation paddle to selectively rotate the alignment carriage about a rotational pitch axis with respect to the base;

a means for engaging a roll rotation paddle to selectively rotate the alignment carriage about a rotational roll axis with respect to the base; and a means for engaging a yaw rotation paddle to selectively rotate the alignment carriage about a rotational yaw axis with respect to the base.

2. An optical device alignment mounting stage as defined in claim 1, further comprising a component mount attached to the alignment carriage for supporting an optical component to be aligned.

3. An optical device alignment mounting stage as defined in claim 1, wherein:

the means for engaging the pitch rotation paddle includes a pitch control screw that selectively engages the pitch rotation paddle;

the means for engaging the roll rotation paddle includes a roll control screw that selectively engages the roll rotation paddle; and the means for engaging the yaw rotation paddle includes a yaw control screw that selectively engages the yaw rotation paddle.

4. An optical device alignment mounting stage as defined in claim 1, wherein at least one of the means for engaging the pitch rotation paddle, the means for engaging the roll rotation paddle, and the means for engaging the yaw rotation paddle includes a linear actuator that selectively engages the at least one rotation paddle.

5. An optical device alignment mounting stage as defined in claim 1, wherein each of the means for engaging is manually operated.

6. An optical device alignment mounting stage as defined in claim 1, wherein the portion of the alignment carriage that engages the base has a spherical shape.

7. An optical device alignment mounting stage as defined in claim 1, wherein the alignment carriage engages the base via a plurality of contact points, the contact points being affixed to the base and being composed of a metallic material.

8. An optical device alignment mounting stage as defined in claim 1, wherein the alignment carriage includes a spherically-shaped surface configured to allow the alignment carriage to move about a rotational center.

9. An optical device alignment mounting stage as defined in claim 1, further comprising a component mount.

10. An optical device alignment mounting stage as defined in claim 9, wherein the component mount is configured to mount the optical device at or near a rotational center of the alignment carriage.

11. An optical device alignment mounting stage as defined in claim 10, wherein the rotational center is an intersection point of a roll axis, a yaw axis, and a pitch axis around which the alignment carriage is configured to rotate.

12. An optical device alignment mounting stage, comprising:
a base;
an alignment carriage adjustably engaged with the base;
at least one rotation member attached to the alignment carriage;
at least one rotational control assembly that engages the at least one rotation member for selectively rotating the alignment carriage with respect to the base
a pitch rotational control assembly that selectively adjusts the alignment carriage about a rotational pitch axis;
a roll rotational control assembly that selectively adjusts the alignment carriage about a rotational roll axis; and
a yaw rotational control assembly that selectively adjusts the alignment carriage about a rotational yaw axis, wherein the pitch rotational control assembly and the yaw rotational control assembly engage a pitch/yaw rotation member for selectively adjusting the alignment carriage, and wherein the roll rotational control assembly engages a roll rotation member for selectively adjusting the alignment carriage.

13. An optical device alignment mounting stage as defined in claim 12, wherein a selected one of the rotational control assemblies can selectively adjust the alignment carriage in the corresponding rotational axis without causing movement of the alignment carriage in the other two rotational axes.

14. An optical device alignment mounting stage as defined in claim 12, further including a translation stage in operable communication with the base to enable translation of the alignment carriage in at least one of three orthogonal Cartesian coordinates.

15. An optical device alignment mounting stage as defined in claim 12, wherein at the at least one rotational control assembly is automatically controlled.

16. An optical device alignment mounting stage as defined in claim 12, wherein the alignment carriage includes a quarter-sphere segment in contact with at least one contact point to allow the alignment carriage to rotate about a roll axis, a yaw axis, and a pitch axis.

17. An optical device alignment mounting stage as defined in claim 16, wherein the rotational center is an intersection point of a roll axis, a yaw axis, and a pitch axis around which the alignment carriage is configured to rotate.

18. An optical device alignment mounting stage as defined in claim 12, further comprising a component mount configured to mount the optical device at or near a rotational center of the alignment carriage.

19. An optical device alignment mounting stage, comprising:
a base defining a partial cavity, the partial cavity including three contact points;
an alignment carriage adjustably positioned in the partial cavity of the base to movably engage the three contact points;
a first rotation paddle attached to the alignment carriage;
a second rotation paddle attached to the alignment carriage;
a pitch rotational control assembly including a threaded pitch control screw that selectively engages the first rotation paddle to adjust the alignment carriage about a rotational pitch axis;
a roll rotational control assembly including a threaded roll control screw that selectively engages the second rotation paddle to adjust the alignment carriage about a rotational roll axis; and
a yaw rotational control assembly including a threaded yaw control screw that selectively engages the first rotation paddle to adjust the alignment carriage about a rotational yaw axis; and
a component mount attached to the alignment carriage, the component mount being capable of adjustably securing an optical component.

20. An optical device alignment mounting stage as defined in claim 19, wherein the rotational pitch axis, the rotational roll axis, and the rotational yaw axis intersect to define a rotational center of the alignment carriage.

21. An optical device alignment mounting stage as defined in claim 20, wherein the component mount is positioned on the alignment carriage such that the optical component is positioned at least proximate the rotational center.

22. An optical device alignment mounting stage as defined in claim 21, wherein:
a longitudinal axis of the pitch control screw intersects the rotational roll axis;
a longitudinal axis of the roll control screw intersects the rotational yaw axis; and
a longitudinal axis of the yaw control screw intersects the rotational roll axis.

23. An optical device alignment mounting stage as defined in claim 22, wherein the physical dimensions of the first and second rotation paddles are configured to limit the range of motion of the alignment carriage.

24. An optical device alignment mounting stage as defined in claim 23, wherein the threaded control screws are manually operated.

* * * * *

UNITED STATES PATENT AND TRADEMARK OFFICE
CERTIFICATE OF CORRECTION

PATENT NO. : 7,286,735 B1  Page 1 of 2
APPLICATION NO. : 10/754161
DATED : October 23, 2007
INVENTOR(S) : Robert Daniel Burn, III It is certified that error appears in the above-identified patent and that said Letters Patent is hereby corrected as shown below:

Drawings
Sheet 3, Fig. 3A, replace the figure with the figure depicted herein below, where indicator "70" is changed to --74--

Signed and Sealed this

Seventeenth Day of August, 2010

David J. Kappos
*Director of the United States Patent and Trademark Office*

Column 8
Line 22, omit "may"
Line 55, change "(the" to --the--
Line 66, change "66" to --6-6--

Column 9
Line 15, omit "may"
Line 23, omit "a"
Line 37, after "70" insert --,--
Line 38, omit the first instance of "and"

Column 12
Line 2, omit the first instance of "at"
Line 34, omit "and"